(12) United States Patent
Beier et al.

(10) Patent No.: US 6,409,805 B1
(45) Date of Patent: Jun. 25, 2002

(54) FLUID FILTER SYSTEM

(75) Inventors: Scott B. Beier; Rex A. Adams, both of Omaha, NE (US)

(73) Assignee: Products Unlimited, Inc., Omaha, NE (US)

( * ) Notice: Subject to any disclaimer, the term of this patent is extended or adjusted under 35 U.S.C. 154(b) by 0 days.

(21) Appl. No.: 09/476,555

(22) Filed: Jan. 3, 2000

Related U.S. Application Data

(63) Continuation-in-part of application No. 08/146,901, filed on Oct. 20, 1993, now Pat. No. 6,071,419.

(51) Int. Cl.[7] .................... B01D 46/00; B01D 37/00
(52) U.S. Cl. .................... 95/287; 55/482; 55/485; 55/486; 55/488; 95/273; 95/286; 210/323.1; 210/767
(58) Field of Search .............. 210/767, 323.1, 210/483, 488, 489; 55/307, 308, 315, 318, 321, 322, 323, 482, 483, 485, 486, 489, 490, 494, 495, 497, 492, 511, 512, 514, 527; 95/273, 286, 287

(56) References Cited

U.S. PATENT DOCUMENTS

| | | | | |
|---|---|---|---|---|
| 1,743,675 A | | 1/1930 | Jordahl | |
| 2,582,777 A | | 1/1952 | Grozinger | 18/47.5 |
| 3,026,968 A | | 3/1962 | Koskinen | 183/73 |
| 3,050,193 A | | 8/1962 | Gillick, Jr. et al. | 210/494.1 |
| 3,217,471 A | * | 11/1965 | Silverman | 55/485 |
| 3,253,072 A | | 5/1966 | Scragg et al. | 264/147 |
| 3,290,870 A | * | 12/1966 | Jensen | 55/486 |
| 3,336,734 A | * | 8/1967 | Schultz | 55/485 |
| 3,568,416 A | * | 3/1971 | Staunton | 55/486 |
| 3,577,710 A | * | 5/1971 | Feldman | 55/318 |
| 3,592,769 A | | 7/1971 | Decker | 210/494.1 |
| 3,744,222 A | * | 7/1973 | Delao | 55/482 |
| 3,912,634 A | | 10/1975 | Howell | 210/222 |
| 4,019,987 A | | 4/1977 | Krasnow | 210/483 |
| 4,105,724 A | | 8/1978 | Talbot | 261/112 |
| 4,321,064 A | * | 3/1982 | Vargo | 55/308 |
| 4,443,233 A | | 4/1984 | Moran | 55/97 |
| 4,466,816 A | * | 8/1984 | Felker | 55/321 |
| 4,555,342 A | | 11/1985 | Grant | 210/493.1 |
| 4,579,658 A | | 4/1986 | Moller | 210/483 |
| 4,627,406 A | * | 12/1986 | Namiki et al. | 55/322 |
| 4,878,974 A | | 11/1989 | Kagawa | 156/163 |
| 4,904,288 A | | 2/1990 | D'Augereau | 55/485 |
| 5,137,634 A | | 8/1992 | Butler et al. | 210/490 |
| 5,437,701 A | * | 8/1995 | Townsley | 55/486 |
| 6,156,089 A | * | 12/2000 | Stemmer et al. | 55/492 |

* cited by examiner

*Primary Examiner*—John Kim
(74) *Attorney, Agent, or Firm*—Thomte, Mazour & Niebergall; Dennis L. Thomte

(57) ABSTRACT

The filter system for filtering particulate material from a generally unidirectional fluid stream comprises a first filter removably positioned in the fluid stream and a second filter removably positioned in the fluid stream downstream of the first filter. The first filter comprises a pre-filter and includes a layer of fluid-permeable material having a plurality of spaced-apart openings extending completely therethrough. The method of utilizing the fluid filter system of this invention is also disclosed and comprises the steps of: (1) removably positioning a first filter in the fluid stream; and (2) removably positioning a fluid-permeable second filter in the fluid stream downstream of the first filter.

8 Claims, 4 Drawing Sheets

FLUID FILTER SYSTEM

CROSS-REFERENCE TO RELATED APPLICATION

This is a continuation-in-part application of Petitioners' earlier application Ser. No. 08/146,901 filed Oct. 20, 1993, now U.S. Pat. No. 6,071,419, entitled FLUID FILTER.

BACKGROUND OF THE INVENTION

The present invention relates generally to disposable filters for fluid streams, and more particularly to a filter system employing one or more pre-filters and one or more final filters located downstream of the pre-filters.

Many materials and combinations of materials have been used as filtration media to remove solid or liquid particulate from fluid streams. The capabilities of such filter media are judged according to three main criteria: (1) the particulate removal efficiency (i.e., the ability of the filter media to capture and retain particulate); (2) the pressure drop for a given flow rate of fluid through the media (which is utilized as a measure of the power required to move the fluid stream through the media); and (3) the holding capacity (i.e., the total amount of particulate which can be retained by the media before the pressure drop becomes so great that the media must be cleaned or replaced).

The filter disclosed in the co-pending application is designed to be placed in the fluid stream to trap the particulates suspended in a particulate-laden fluid stream. The cost of the filters disclosed in the co-pending application is not insignificant, so anything that can be done to extend the life thereof will result in a significant cost reduction in the filtering process.

SUMMARY OF THE INVENTION

A filter system for filtering particulate material from a generally unidirectional fluid stream is disclosed comprising a first filter removably positioned in the fluid stream and a second filter removably positioned in the fluid stream downstream of the first filter. The first filter is a pre-filter and comprises a layer of fluid-permeable material having an intake side and a discharge side with the layer having a plurality of spaced-apart openings extending completely therethrough. The first and second filters may be either placed adjacent one another in the fluid stream or spaced-apart in the fluid stream. Further, a plurality of first filters may be utilized. Additionally, a plurality of the second filters may be positioned in the fluid stream. The openings extending through the first filter are sufficiently large such that the openings do not plug due to the accumulation of filter particulate. The use of the fluid permeable material in the first filter allows some particulate-laden fluid to pass through the material itself, while some particulate material is filtered by the permeable material in the first filter. The purpose of the first filter being located upstream of the second or normal filter is to reduce the amount of particulate material being presented to the second filter. The presence of the openings in the first filter reduces the amount of raw material required to cover a fluid flow area, therefore enabling the pre-filter to be made less expensively.

It is a principal object of the invention to provide an improved fluid filter system.

Still another object of the invention is to provide a method of filtering particulate material from a generally unidirectional fluid stream.

A further object of the invention is to provide a fluid filter system employing a pre-filter upstream of the normal filter.

Yet another object of the invention is to provide a fluid filter system which employs the use of relatively inexpensive pre-filtering material upstream of the normal filter to extend the life of the normal filter.

Still another object of the invention is to provide a fluid filter system employing a pre-filter which is comprised of a layer of fluid-permeable material having a plurality of spaced-apart openings extending completely therethrough with a reinforcing material being associated therewith to prevent the filter from collapsing or sagging.

These and other objects will be apparent to those skilled in the art.

DESCRIPTION OF THE PREFERRED EMBODIMENT

Figure 1:
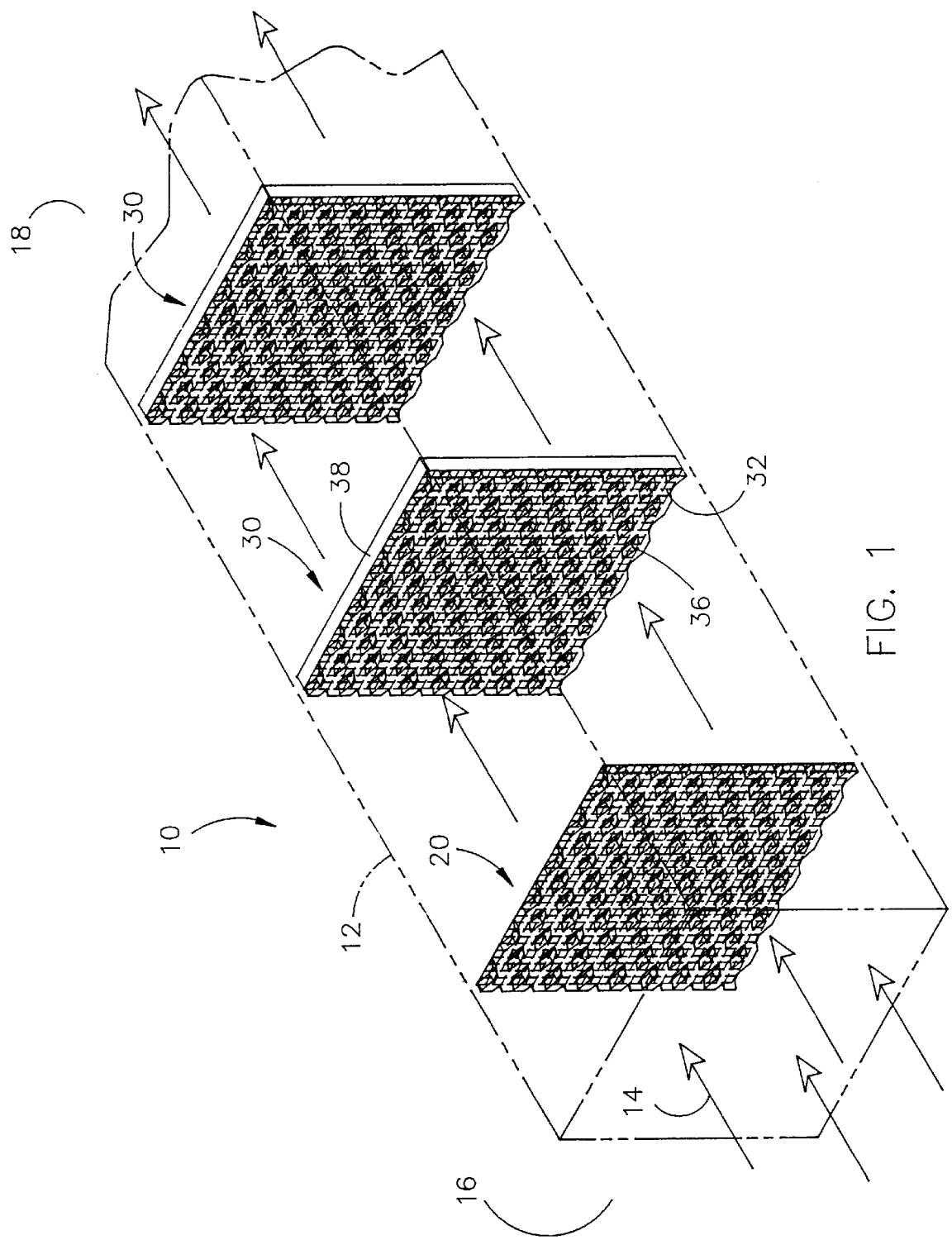
FIG. 1 is a perspective view illustrating an embodiment of the filter system of this invention.

In FIG. 1, the numeral 10 refers generally to an embodiment of the fluid filter system of this invention which is utilized in a conduit or passageway 12 through which is passing a particulate-laden fluid stream travelling in the direction indicated by the arrows 14. For purposes of description, the numeral 16 refers to the upstream end of the conduit 12 while the numeral 18 refers to the downstream side of the conduit. The numeral 20 refers to a first filter utilized in this invention which comprises a pre-filter.

Figure 2:
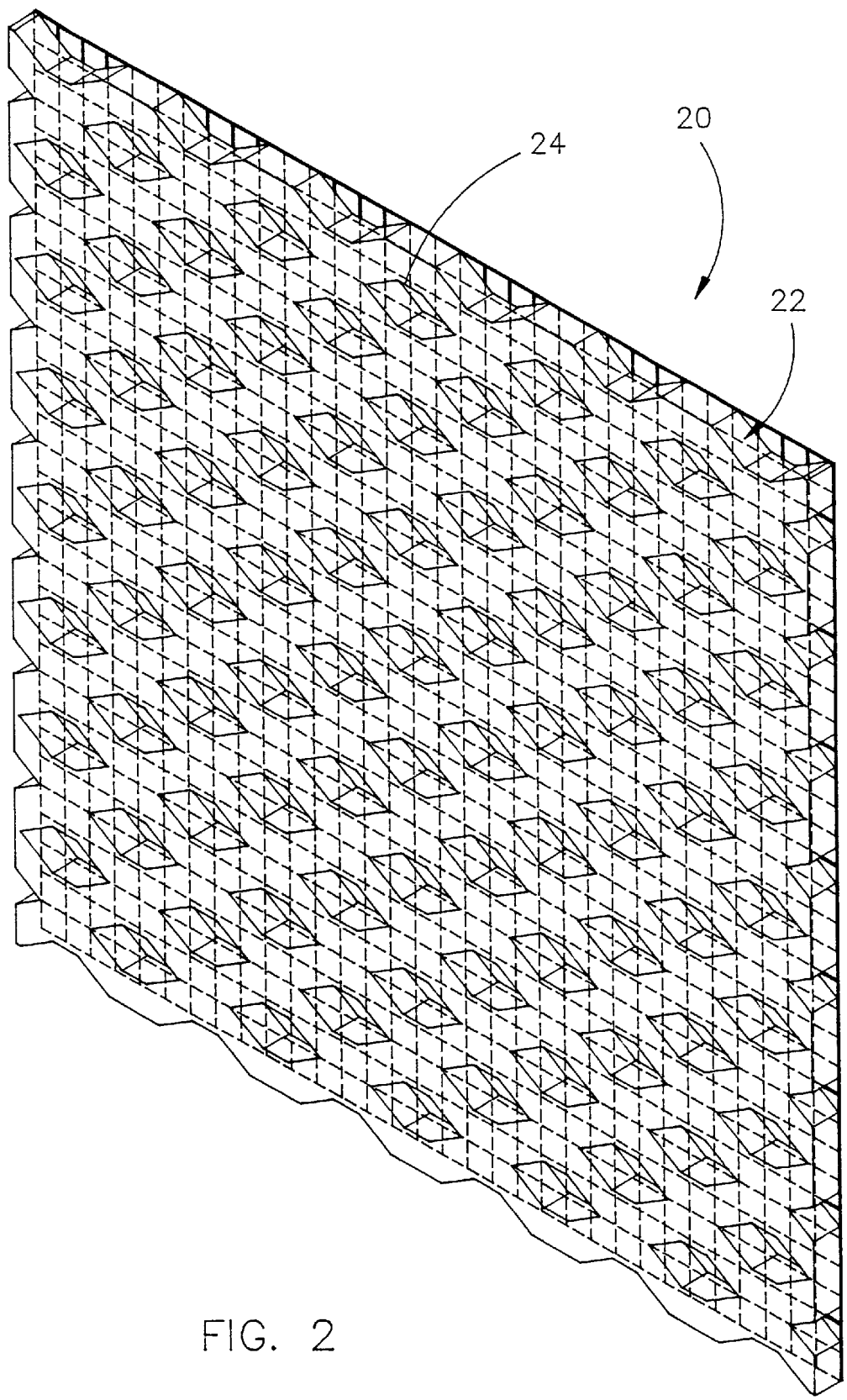
FIG. 2 is a partial perspective view of the pre-filter employed in the filter system of this invention.
Figure 4:
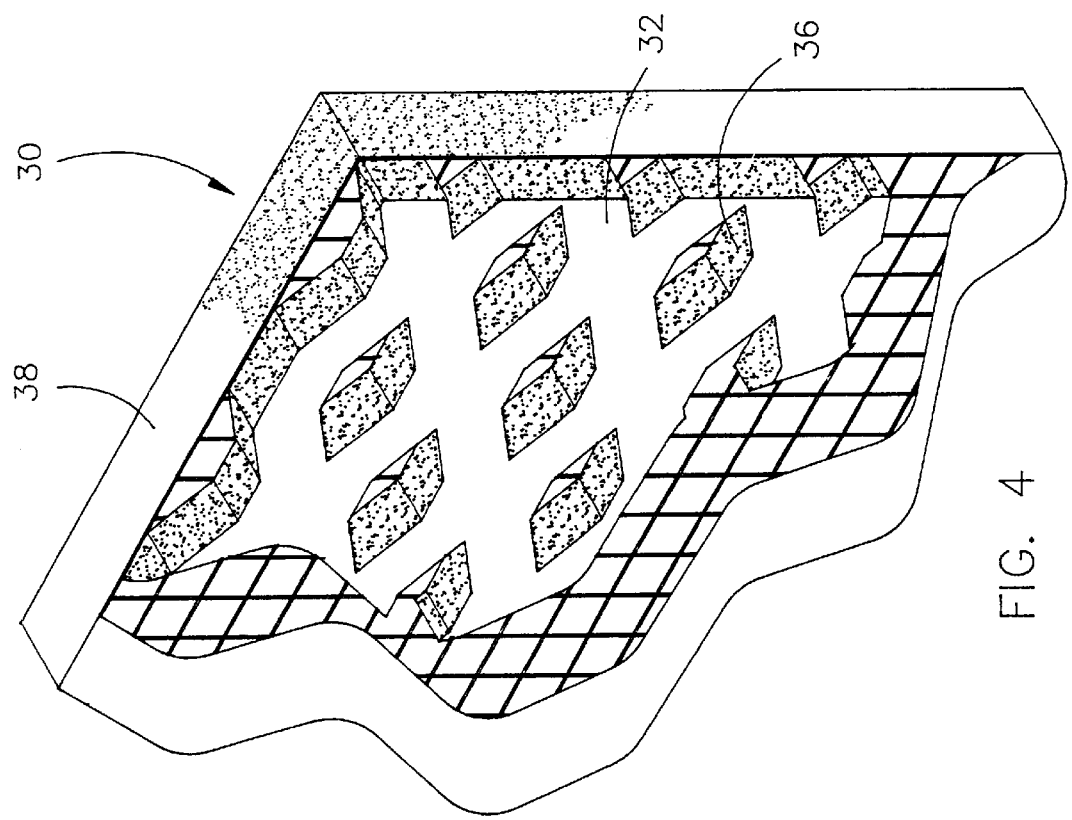
FIG. 4 is a partial perspective view of the downstream filter of this invention with portions thereof cut away to more fully illustrate the invention.
Figure 3:
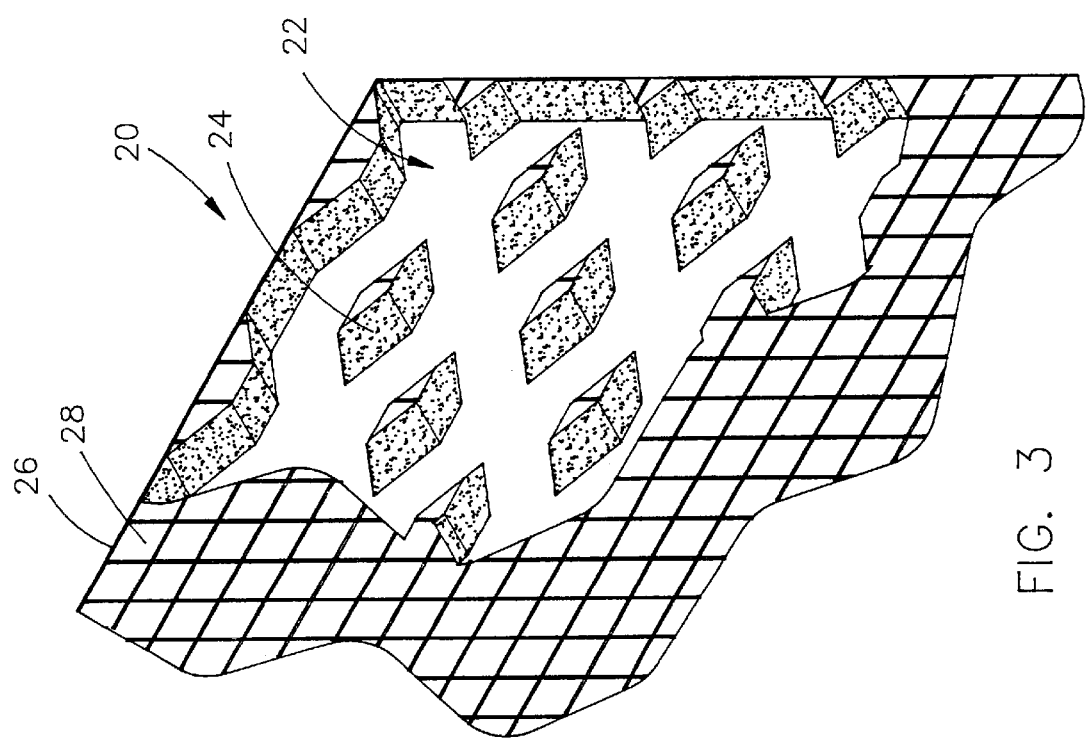
FIG. 3 is a partial perspective view of the pre-filter with portions thereof cut away to more fully illustrate the invention.

As seen in FIG. 2, filter 20 comprises a layer of fluid-permeable material 22 having a plurality of uniformly spaced openings 24 formed therein which extend completely through the material. Although it is preferred that the openings 24 be uniformly spaced, the openings 24 could be irregularly spaced and irregularly sized, if desired. It is preferred that a reinforcing material 26 be attached to or integrated within the layer 22 to prevent the filter from collapsing or sagging when positioned in the fluid stream. Preferably, layer 22 is comprised of a stabilized, high loft, non-woven batting material. Reinforcing material 26 may be formed of a string-like net material or a plastic net material having openings 28.

Figure 5:
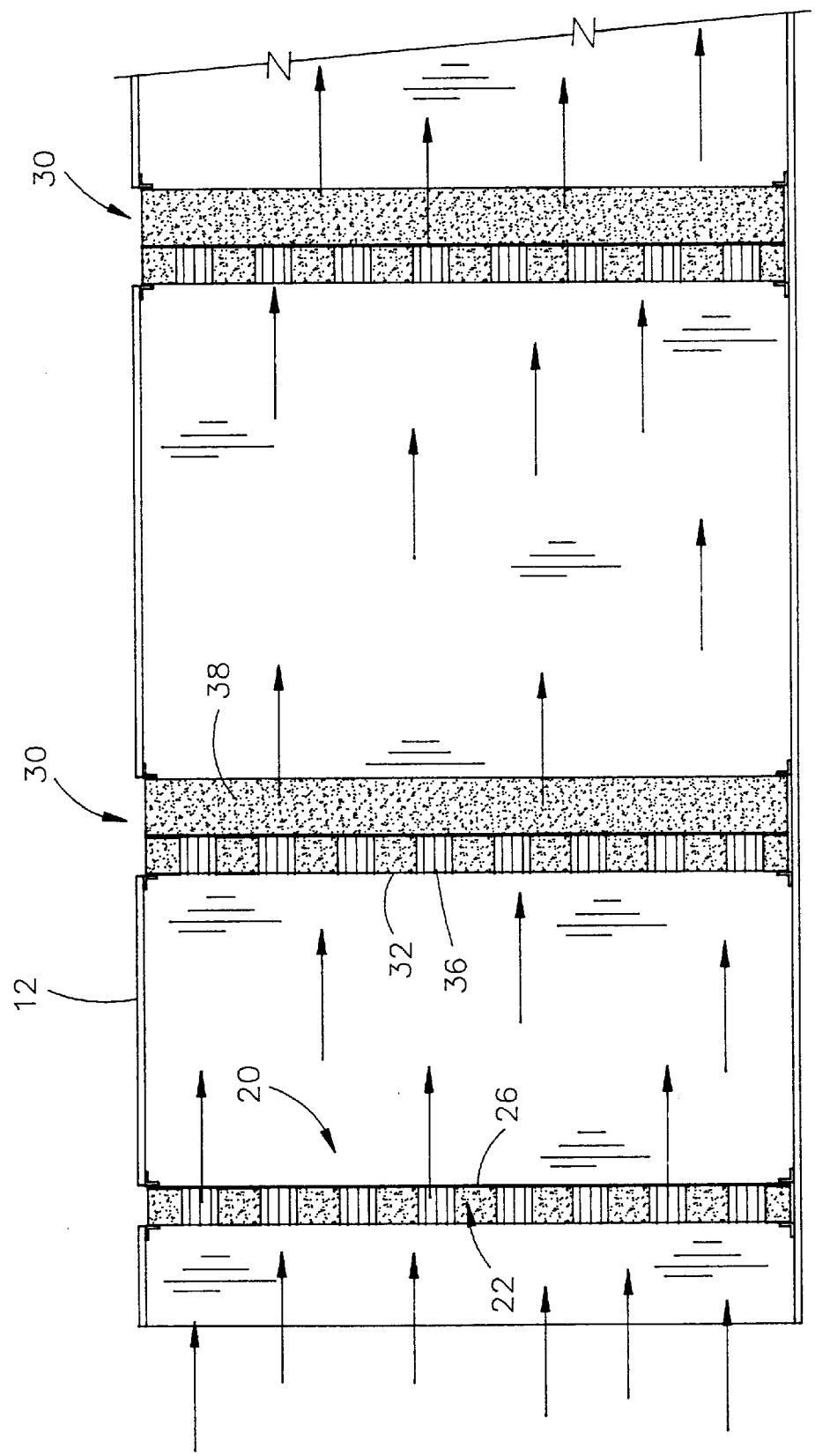
FIG. 5 is a side view illustrating an embodiment of the fluid filter system of this invention.

The pre-filter 20 is removably positioned in the conduit 12 in any convenient fashion to facilitate the ease of replacement thereof. Although FIG. 1 illustrates that only a single filter 20 is utilized in the filter system, any number of the pre-filters 20 may be utilized. At least one regular or final filter 30 is removably positioned in the conduit 12 in conventional fashion, with the fluid filter or final filters 30 being positioned downstream of the pre-filter 20. As seen in FIGS. 1 and 5, a plurality of the final filters 30 are utilized. Filters 30 may take any form, but it is preferred that they be constructed in the manner illustrated in the co-pending application, Ser. No. 08/146,901, U.S. Pat. No. 6,071,419, wherein a first layer of fluid permeable material 32 is utilized which has a plurality of openings 36 formed therein and wherein a second layer of fluid permeable material, without openings, is positioned downstream of the layer 32. The filter 30 is preferably constructed of the same material as that of the filter 20.

The system disclosed herein essentially relates to an improved "disposable" pre-filtering material that utilizes a layer of fluid-permeable material having many large openings 24 extending completely through the layer 22. The filter 20 is placed upstream of any existing filter such that the pre-filtering material is exposed to the particulate-laden fluid stream before the normal filter is exposed to the fluid stream. The pre-filter 20 may be either placed against the upstream surface of the existing filter or separated by a space therefrom. The openings 24 in filter 20 are sufficiently large such that the openings 20 do not plug due to the accumulation of filtered particulate. Inasmuch as the openings 24 are sufficiently large to prevent plugging, the filter 20 does not completely restrict the flow of fluid through the media even when the media is heavily laden with particulate. The use of the fluid-permeable material in the filter 20 allows some particulate-laden fluid to pass through the material itself. During this passage through the permeable material, some particulate is filtered from the fluid resulting in the amount of particulate present in the fluid stream downstream of the pre-filter 20 being significantly less than the amount present upstream, but without the risk of the pre-filter 20 becoming completely plugged.

Furthermore, the presence of the openings 24 in the filter 20 reduces the amount of raw material required to cover a fluid flow area. Since less material is required, the pre-filter 20 can be made very inexpensively.

Although the drawings illustrate that pre-filter 20 has the same dimensions as the filter or filters 30, pre-filter 20 could have a dimension less than the filter or filters 30 such that it would not extend completely across the flow area.

Thus it can be seen that the fluid filter system of this invention, as well as the method of using the same, accomplish at least all of their stated objectives.

We claim:

1. A method of filtering particulate material from a generally unidirectional fluid stream, comprising the steps of:

removably positioning a plurality of first filters in the fluid stream;

and removably positioning a fluid-permeable second filter in the fluid stream downstream of the first filters;

said first filters being a pre-filter and comprising a layer of fluid-permeable material having an intake side and a discharge side, said layer having a plurality of spaced-apart openings extending completely therethrough.

2. The method of claim 1 wherein said plurality of first filters are spaced-apart from one another.

3. A method of filtering particulate material from a generally unidirectional fluid stream, comprising the steps of:

removably positioning a first filter in the fluid stream;

and removably positioning a fluid-permeable second filter in the fluid stream downstream of the first filter;

said first filter being a pre-filter and comprising a layer of fluid-permeable material having an intake side and a discharge side, said layer having a plurality of spaced-apart openings extending completely therethrough;

said second filter comprising a layer of fluid-permeable material having an intake side and a discharge side and wherein said layer has a plurality of spaced-apart openings extending thereinto from its intake side which extend through less than the entire thickness thereof.

4. The method of claim 3 wherein said openings in said second filter are uniformly spaced across the intake side thereof.

5. A filter system for filtering particulate material from a generally unidirectional fluid stream, comprising:

a plurality of first filters removably positioned in the fluid stream;

and a second filter removably positioned in the fluid stream downstream of said first filters;

said first filters being pre-filters and comprising a layer of fluid-permeable material having an intake side and a discharge side, said layer having a plurality of spaced-apart openings extending completely therethrough.

6. The filter system of claim 5 wherein said plurality of first filters are spaced-apart from one another.

7. A filter system for filtering particulate material from a generally unidirectional fluid stream, comprising:

a first filter removably positioned in the fluid stream;

and a second filter removably positioned in the fluid stream downstream of said first filter;

said first filter being a pre-filter and comprising a layer of fluid-permeable material having an intake side and a discharge side, said layer having a plurality of spaced-apart openings extending completely therethrough;

said second filter comprising a layer of fluid-permeable material having an intake side and a discharge side and wherein said layer has a plurality of spaced-apart openings extending thereinto from its intake side which extend through less than the entire thickness thereof.

8. The filter system of claim 7 wherein said openings in said second filter are uniformly spaced across the intake side thereof.

\* \* \* \* \*